(12) United States Patent
Chiba et al.

(10) Patent No.: US 6,556,701 B1
(45) Date of Patent: Apr. 29, 2003

(54) METHOD OF AND APPARATUS FOR EXTRACTING DOTTED LINE, AND STORAGE MEDIUM THEREOF

(75) Inventors: Koichi Chiba, Kawasaki (JP); Shinichi Eguchi, Kawasaki (JP); Kouichi Kanamoto, Kawasaki (JP); Katsutoshi Kobara, Kawasaki (JP); Maki Tabuki, Kawasaki (JP); Yutaka Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,283

(22) Filed: Oct. 20, 1999

(30) Foreign Application Priority Data

May 31, 1999 (JP) ............................. 11-153008

(51) Int. Cl.[7] ................................. G06K 9/00
(52) U.S. Cl. ..................... 382/137; 382/173; 382/174; 382/176; 382/190; 382/218; 358/462; 345/622
(58) Field of Search ................... 382/137, 138, 382/139, 140, 173, 174, 175, 176, 177, 178, 179, 180, 112, 113, 190, 189, 194, 197, 198, 199, 187, 186, 203, 292, 289; 345/622; 358/1.11, 462; 707/500, 513, 515, 516, 517, 518, 519, 520, 521, 900, 908

(56) References Cited

U.S. PATENT DOCUMENTS

| 5,239,592 A | * | 8/1993 | Kameyama et al. | ........ 382/138 |
| 5,638,462 A | * | 6/1997 | Shirakawa | ................ 382/186 |
| 5,966,455 A | * | 10/1999 | Saito | ........................ 382/112 |
| 6,104,833 A | * | 8/2000 | Naoi et al. | ................. 382/177 |

FOREIGN PATENT DOCUMENTS

| JP | 10-111931 | 4/1998 |
| JP | 10-214310 | 8/1998 |
| JP | 10-293845 | 11/1998 |

* cited by examiner

Primary Examiner—Jayanti K. Patel
Assistant Examiner—Ali Bayat
(74) Attorney, Agent, or Firm—Arent Fox Kintner Plotkin & Kahn, PLLC (57) ABSTRACT

Disclosed are a method of and an apparatus for extracting a dotted line from an binary image of a document, and a storage medium thereof. The isolated points are extracted from the binary image. The isolated points configuring a candidate of the dotted line are extracted based on a positional relationship between the extracted isolated points. A validity of the isolated points configuring the candidate of the dotted line is checked. The dotted line from a positional relationship between groups of the extracted isolated points of the candidate of the dotted line. The dotted line can be thereby precisely extracted even if some isolated points are lost due to an. under-density of the image etc.

7 Claims, 11 Drawing Sheets

| Bank Name / Branch Name | Classification | Account Number | Receiver Name | Amount | Fee |
|---|---|---|---|---|---|
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | Total | | |

FIG. 10

Prior Art

FIG. 11

Prior Art

| Amount | Fee |
|--------|-----|
|        |     |
|        |     |
|        |     |
|        |     |

FIG. 12
Prior Art

| Amount | Fee |
|---|---|
| 1234567 | |
| 7894562 | |
| 456123 | |

Prior Art

METHOD OF AND APPARATUS FOR EXTRACTING DOTTED LINE, AND STORAGE MEDIUM THEREOF

BACKGROUND OF THE INVENTION

1. Field of the Invention

The present invention relates generally to a method of and an apparatus for extracting a dotted line from a binary image of a document and to a storage medium thereof, and more particularly to a method of and an apparatus for extracting the dotted line on the basis of a positional relationship between the isolated points configuring the dotted line to a storage medium thereof.

2. Related Background Art

In recent years, a character recognizing apparatus has been utilized for reading characters of the document. It is required for reading the characters of the document to detect a character region defined by a rule. What is exemplified as a method thereof may be a method of registering the character region beforehand, and a method of automatically analyzing a table format on the basis of a positional relationship between the rules.

In any methods, the character regions described above is required to be detected. Line segments for defining this character region are dotted lines in addition to solid lines. A method of precisely extracting the dotted line is therefore desired.

Figure 9:
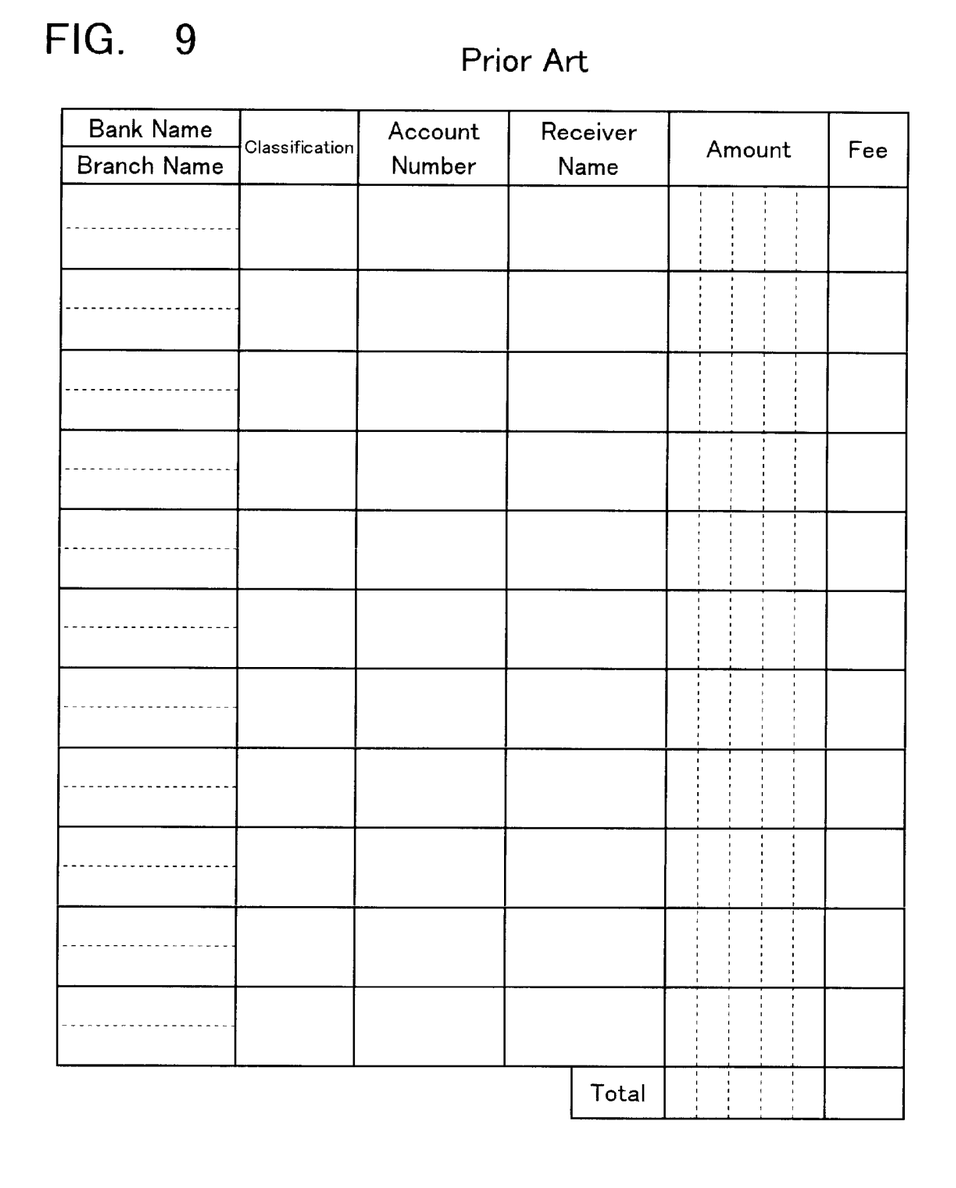
FIG. 9 is an explanatory diagram showing an example of a sheet of document using the dotted lines.
Figure 10:
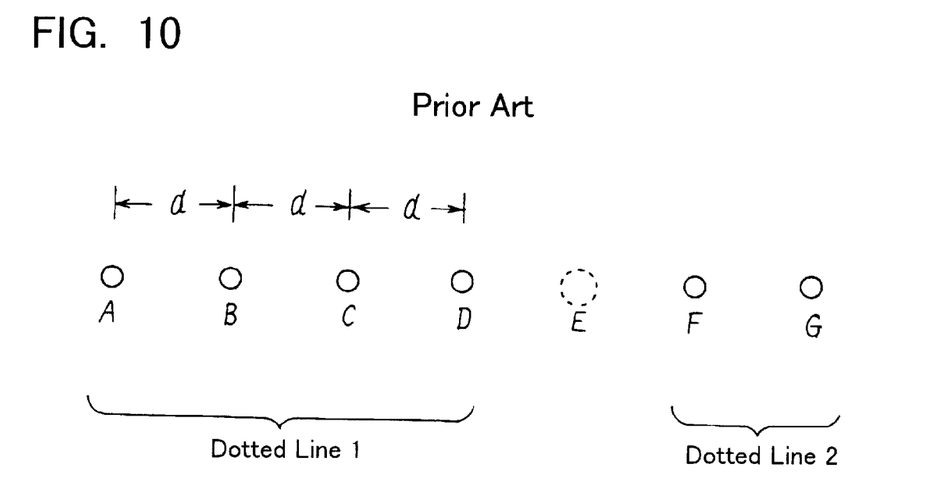
FIG. 10 is an explanatory diagram showing the prior art.

FIG. 9 is an explanatory diagram showing an example of a sheet of document using the dotted line. FIG. 10 is an explanatory diagram showing the prior art.

FIG. 9 illustrates a money transfer sheet in a financial institute. In this example the transfer sheet is formed with entry columns for entering a name of bank, a name of branch office, a classification, an account number, a name of receiver, an amount of money and a fee. Then, the name of bank and the name of branch office are sectioned by a dotted line. Similarly, the column for the amount of money is sectioned by the dotted line. The dotted line is required to be extracted for recognizing the columns sectioned by the dotted lines.

As shown in FIG. 10, according to the conventional dotted line extracting method, isolated points A, B, C and D are extracted from an image. The isolated points each have a predetermined size and are isolated from each other. Then, the isolated points, which are consecutively arranged and have a fixed value [d] as a spacing between the isolated points adjacent to each other, are collected as those configuring the dotted line. Referring again to FIG. 10, if an isolated point E is not detected, the isolated points A, B, C and D configure a dotted line 1, and isolated points F and G configure a dotted line 2.

Thus, according to conventional method, the dotted line is extracted by seeking out the consecutively arranged isolated points between which the spacing has the fixed value.

Figure 11:
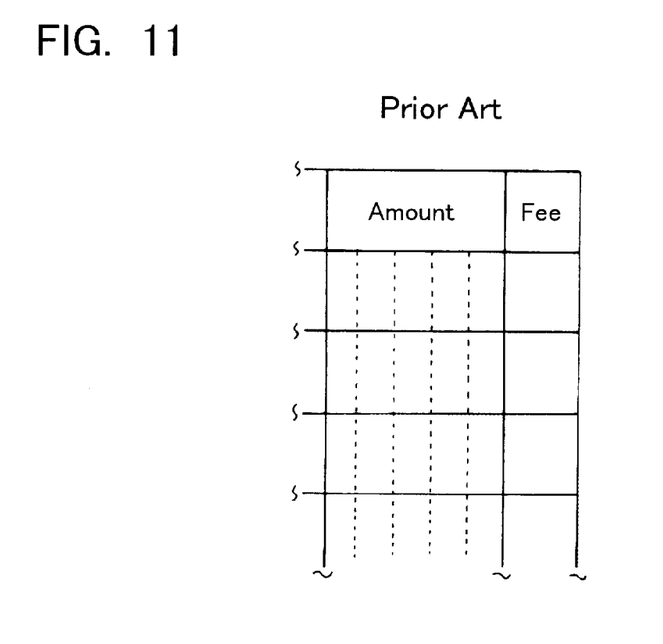
FIG. 11 is an explanatory diagram (part 1) showing a problem inherent in the prior art.
Figure 12:
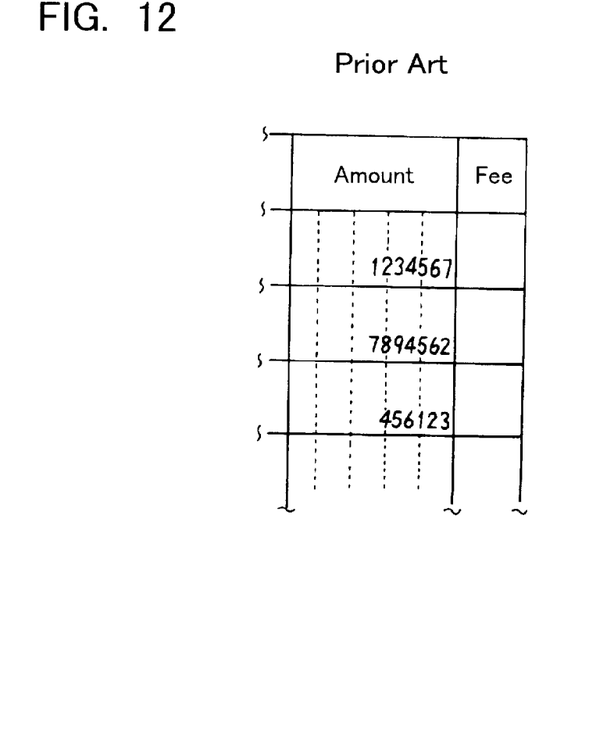
FIG. 12 is an explanatory diagram (part 2) showing a problem inherent in the prior art.
Figure 13:
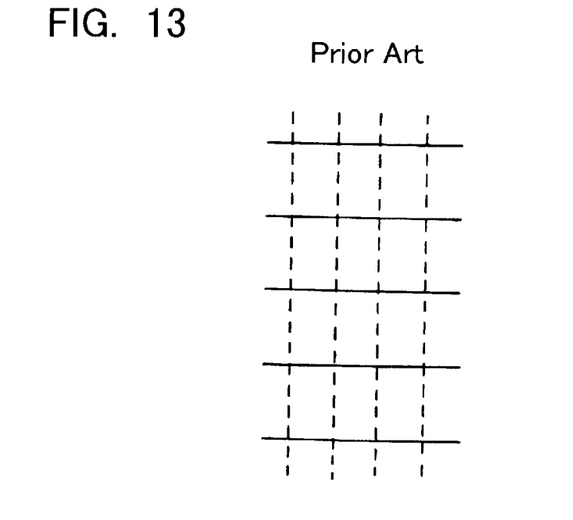
FIG. 13 is an explanatory diagram (part 3) showing a problem inherent in the prior art.
Figure 14:
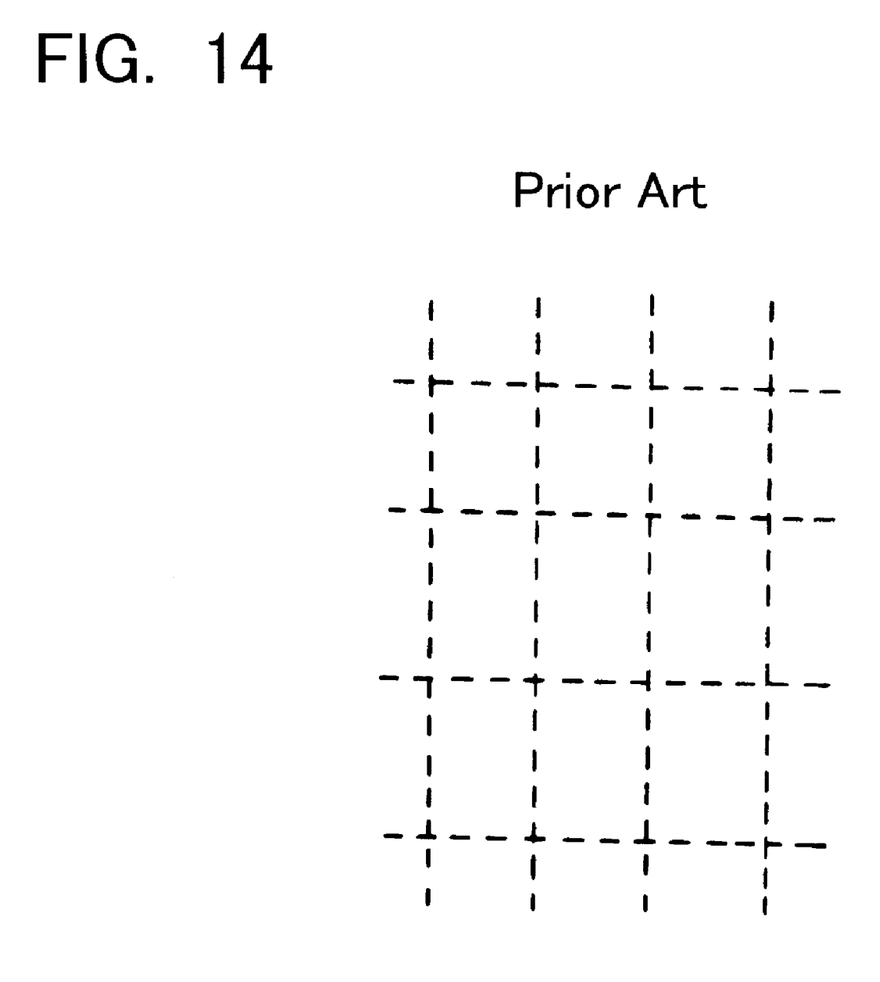
FIG. 14 is an explanatory diagram (part 4) showing a problem inherent in the prior art.

FIGS. 11 through 14 are explanatory diagram showing problems inherent in the prior art. FIG. 11 is the explanatory diagram showing a case where an under-density occurs in a result of reading the image. FIG. 12 is the explanatory diagram showing a case where a character comes into contact with the dotted line. FIG. 13 is the explanatory diagram showing a case where a solid line intersect the dotted lines. FIG. 14 is the explanatory diagram showing a case where other dotted lines intersect the dotted lines.

The conventional dotted line extracting method has such a problem that if some of the isolated points configuring the dotted line are lost, the dotted line is unable to be precisely extracted.

For example, as shown in FIG. 11, if the under-density of the line occurs in the result of reading the image, the dotted line also falls into an under-density. Accordingly, as shown in FIG. 10, it follows that the isolated point E of the dotted line configured by the isolated points A–G, is lost due to the under-density. Therefore, according to the conventional dotted line extracting method, it follows that the dotted line is segmented into the first dotted line 1 configured by the isolated points A–D, and the second dotted line 2 configured by the isolated points F and G. This makes it difficult to accurately extract the dotted line.

Further, as illustrated in FIG. 12, if the character comes into contact with the dotted line, a size of the point positioned at the contact portion increases. Therefore, the isolated points configuring the dotted line are not extracted as the normal isolated points. Consequently, the isolated points disappear. The dotted line is thereby segmented in the same way as the above-mentioned, and it is also difficult to precisely extract the dotted line.

Furthermore, as shown in FIG. 13, if the solid line intersects the dotted line as illustrated in FIG. 13, and if other dotted lines intersect the dotted lines as shown in FIG. 14, the sizes of the points positions at the intersections increase. The isolated points configuring the dotted line are not therefore extracted as the normal isolated points. The dotted line is thereby segmented as in the previous case, and it is difficult to accurately extract the dotted line.

SUMMARY OF THE INVENTION

Accordingly, it is a primary object of the present invention to provide a dotted line extracting method and a dotted line extracting apparatus which are capable of precisely extracting a dotted line even if some of isolated points configuring the dotted line are not extracted, and a storage medium thereof.

It is another object of the present invention to provide a dotted line extracting method and a dotted line extracting apparatus which are capable of precisely extracting a dotted line even if some of isolated points configuring the dotted line are not extracted due to an under-density of an image, and a storage medium thereof.

It is still another object of the present invention to provide a dotted line extracting method and a dotted line extracting apparatus which are capable of precisely extracting a dotted line even if some of isolated points configuring the dotted line are not extracted due to an intersection with a character, and a storage medium thereof.

It is a further object of the present invention to provide a dotted line extracting method and a dotted line extracting apparatus which are capable of precisely extracting a dotted line even if some of isolated points configuring the dotted line are not extracted due to intersections with other solid or dotted lines, and a storage medium thereof.

To accomplish the above objects, according to a first aspect of the present invention, a dotted line extracting method comprises a first step of extracting isolated points from an image on the document, a second step of extracting the isolated points configuring a candidate of the dotted line on the basis of a positional relationship between the two adjacent isolated points, and a third step of judging a validity of the candidate of the dotted line from a positional relationship between groups of the extracted isolated points of the candidate of the dotted line.

Roughly observing the positional relationship between the isolated points, the isolated points configuring the candidate of the dotted line are extracted. For example, even when a spacing between the isolated point and the isolated point is not only a fixed value but also a multiple of the fixed value, the isolated points are extracted as those configuring the candidate of the dotted line. Next, the validity of the dotted line is checked with respect to the extracted dotted line in terms of a regularity of the spacings between groups of the isolated points.

Thus, after extracting the candidate of the dotted line on the basis of the positional relationship between the two isolated points, the validity of the dotted line is checked on the basis of the positional relationship between the groups of the isolated points. Hence, even when the isolated points are partially lost, the dotted line can be precisely extracted. Namely, if some of the isolated points essentially configuring the dotted line are lost due to an under-density of the image, a contact with a character, and intersections with solid lines or other dotted lines, the dotted line can be accurately extracted.

According to a second aspect of the present invention, the third step includes a step of judging the validity of the candidate of the dotted line by judging a regularity of spacing between the isolated points.

According to a third aspect of the present invention, the third step further includes a step of judging the validity of the candidate of the dotted line by calculating a gradient of a line segment configured by the group of the isolated points.

According to a fourth aspect of the present invention, the third step includes a step of calculating a difference between distances between the isolated points adjacent to each other, and, based on this difference, judging the validity of the candidate of the dotted line.

According to a fifth aspect of the present invention, the second step includes a step of calculating a distance between the isolated points adjacent to each other, and a step of comparing the distance with a predetermined threshold value.

According to a sixth aspect of the present invention, the second step includes a step of calculating a deviation between the isolated points adjacent to each other, and a step of comparing the deviation with a predetermined threshold value.

According to a seventh aspect of the present invention, the second step includes a step of calculating a difference between sizes of the isolated points adjacent to each other, and a step of comparing the difference between the sizes with a predetermined threshold value.

According to an eighth aspect of the present invention, the second step includes a step of counting the number of the isolated points configuring a candidate of the dotted line, and a step of comparing the number of the isolated points with a predetermined threshold value.

According to a ninth aspect of the present invention, a dotted line extracting apparatus comprises a reading unit for reading an image on the document, and a processor for extracting isolated points from the image, thereafter extracting the isolated points configuring a candidate of the dotted line on the basis of a positional relationship between the two adjacent isolated points, and then judging a validity of the candidate of the dotted line from a positional relationship between groups of the extracted isolated points of the candidate of the dotted line.

According to a tenth aspect of the present invention, the processor judges the validity of the candidate of the dotted line by judging a regularity of a spacing between the isolated points.

According to an eleventh aspect of the present invention, the processor judges the validity of the candidate of the dotted line by calculating a gradient of a line segment configured by the group of the isolated points.

According to a twelfth aspect of the present invention, the processor calculates a difference between distances between the isolated points adjacent to each other, and, based on this difference, judging the validity of the candidate of the dotted line.

According to a thirteenth aspect of the present invention, the processor calculates a distance between the isolated points adjacent to each other, and thereafter compares the distance with a predetermined threshold value.

According to a fourteenth aspect of the present invention, the processor calculates a deviation between the isolated points adjacent to each other, and thereafter compares the deviation with a predetermined threshold value.

According to a fifteenth aspect of the present invention, the processor calculates a difference between sizes of the isolated points adjacent to each other, and compares the difference between the sizes with a predetermined threshold value.

According to a sixteenth aspect of the present invention, the processor counts the number of the isolated points configuring a candidate of the dotted line, and thereafter compares the number of the isolated points with a predetermined threshold value.

According to a seventeenth aspect of the present invention, a storage medium comprises a first information for extracting isolated points from an image on a document, a second information for extracting the isolated points configuring a candidate of the dotted line on the basis of a positional relationship between the two adjacent isolated points, and a third information for judging a validity of the candidate of the dotted line from a positional relationship between groups of the extracted isolated points of the candidate of the dotted line.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DESCRIPTION OF THE PREFERRED EMBODIMENT

Figure 1:
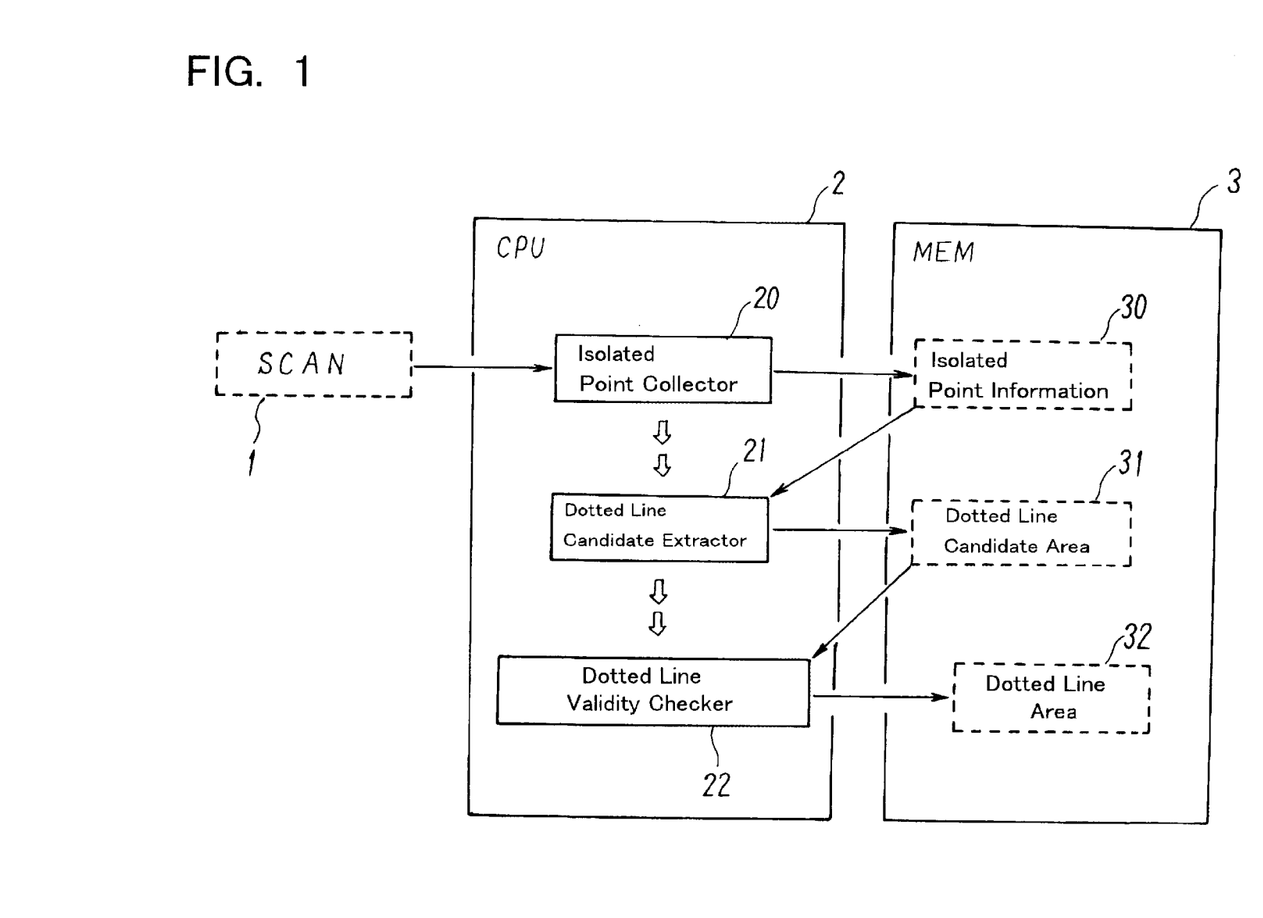
FIG. 1 is a block diagram showing one embodiment of the present invention.
Figure 2:
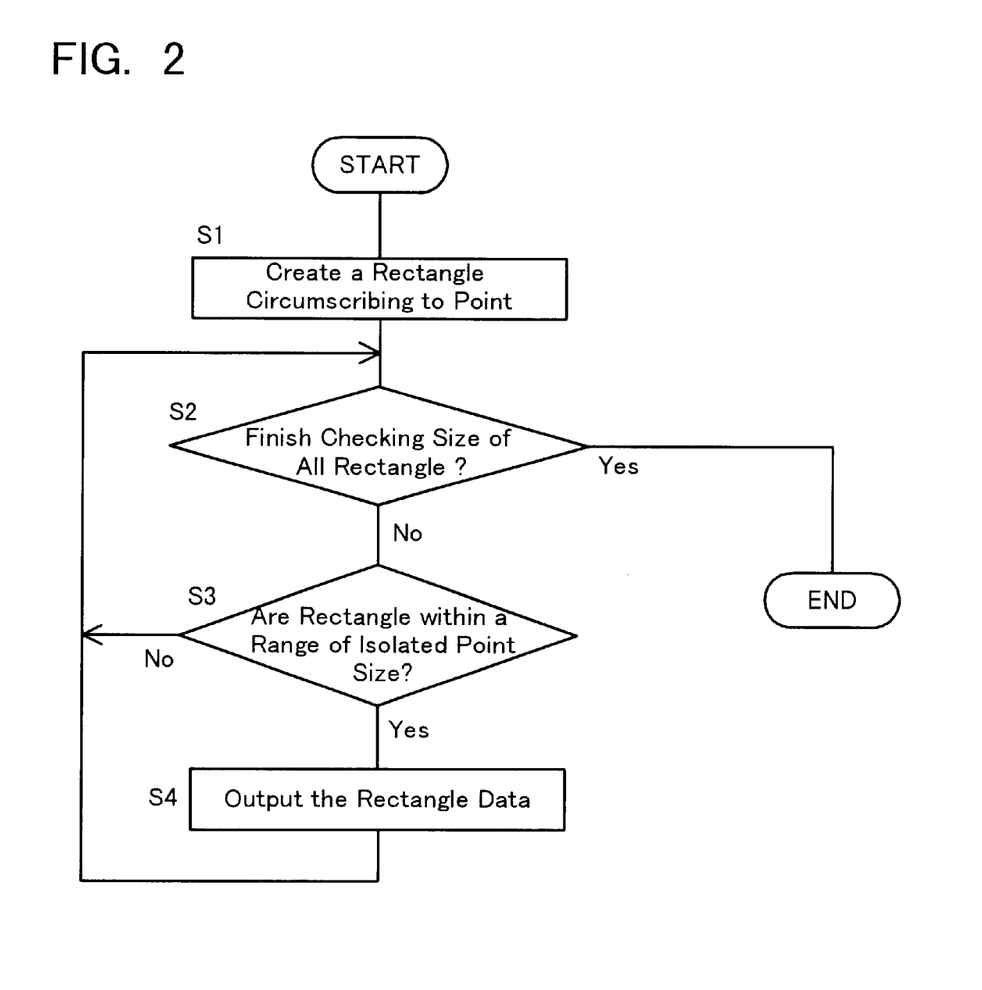
FIG. 2 is a flowchart showing an isolated point collecting process in FIG. 1.
Figure 3:
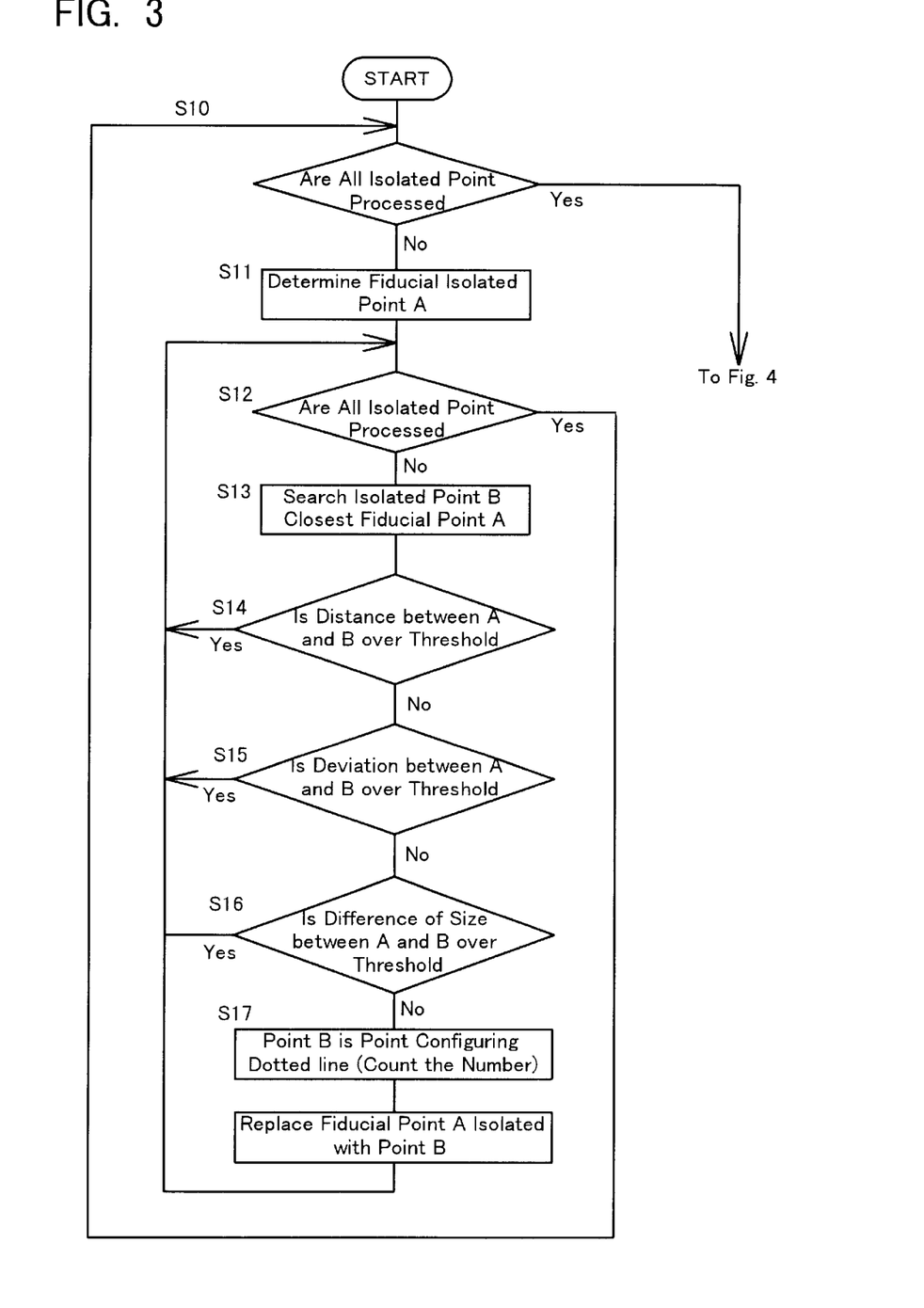
FIG. 3 is a flowchart (part 1) showing a dotted line candidate extracting process in FIG. 1.
Figure 4:
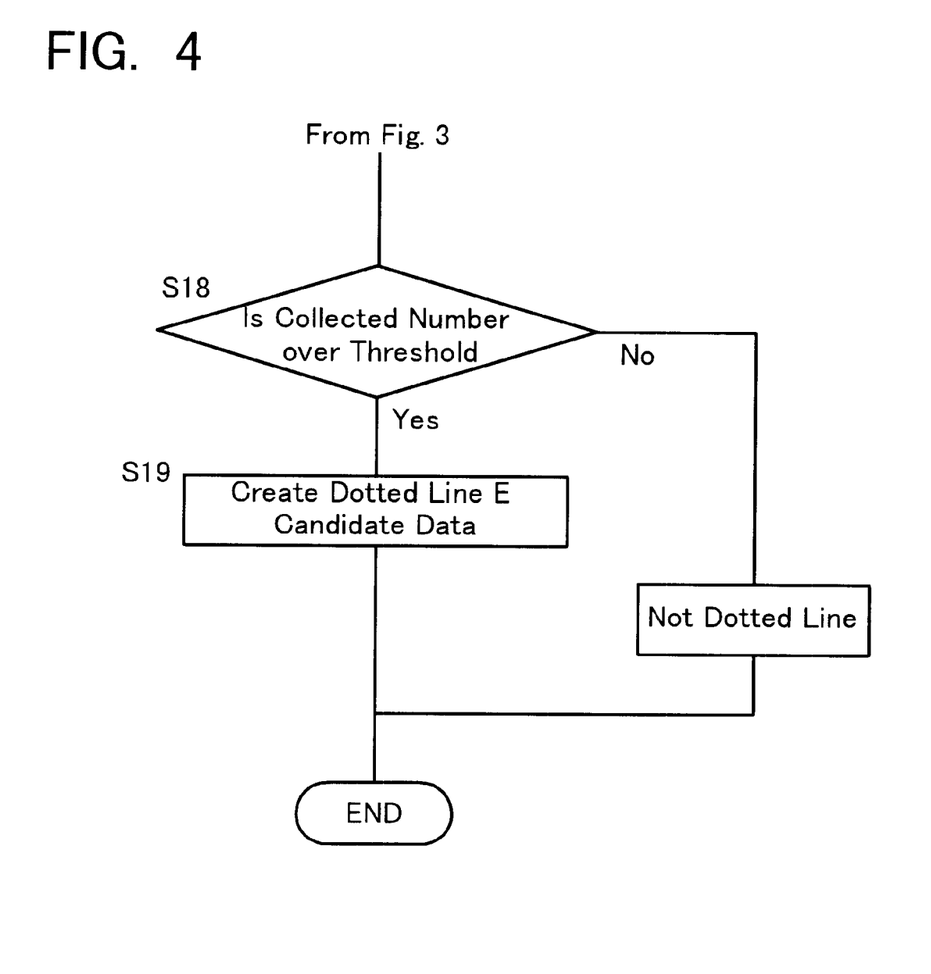
FIG. 4 is a flowchart (part 2) showing the dotted line candidate extracting process in FIG. 1.
Figure 5:
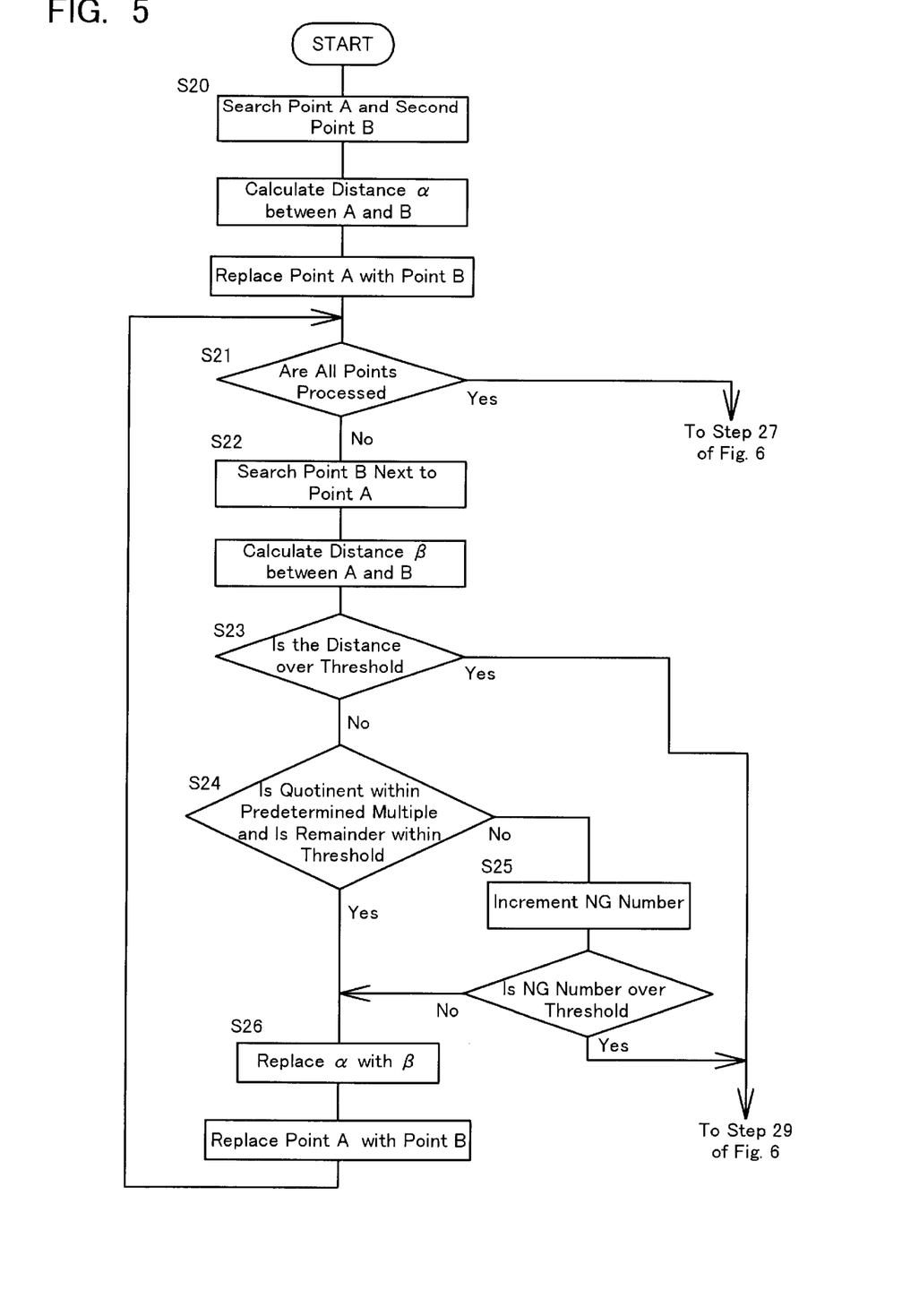
FIG. 5 is a flowchart (part 1) showing a dotted line validity check process in FIG. 1.
Figure 6:
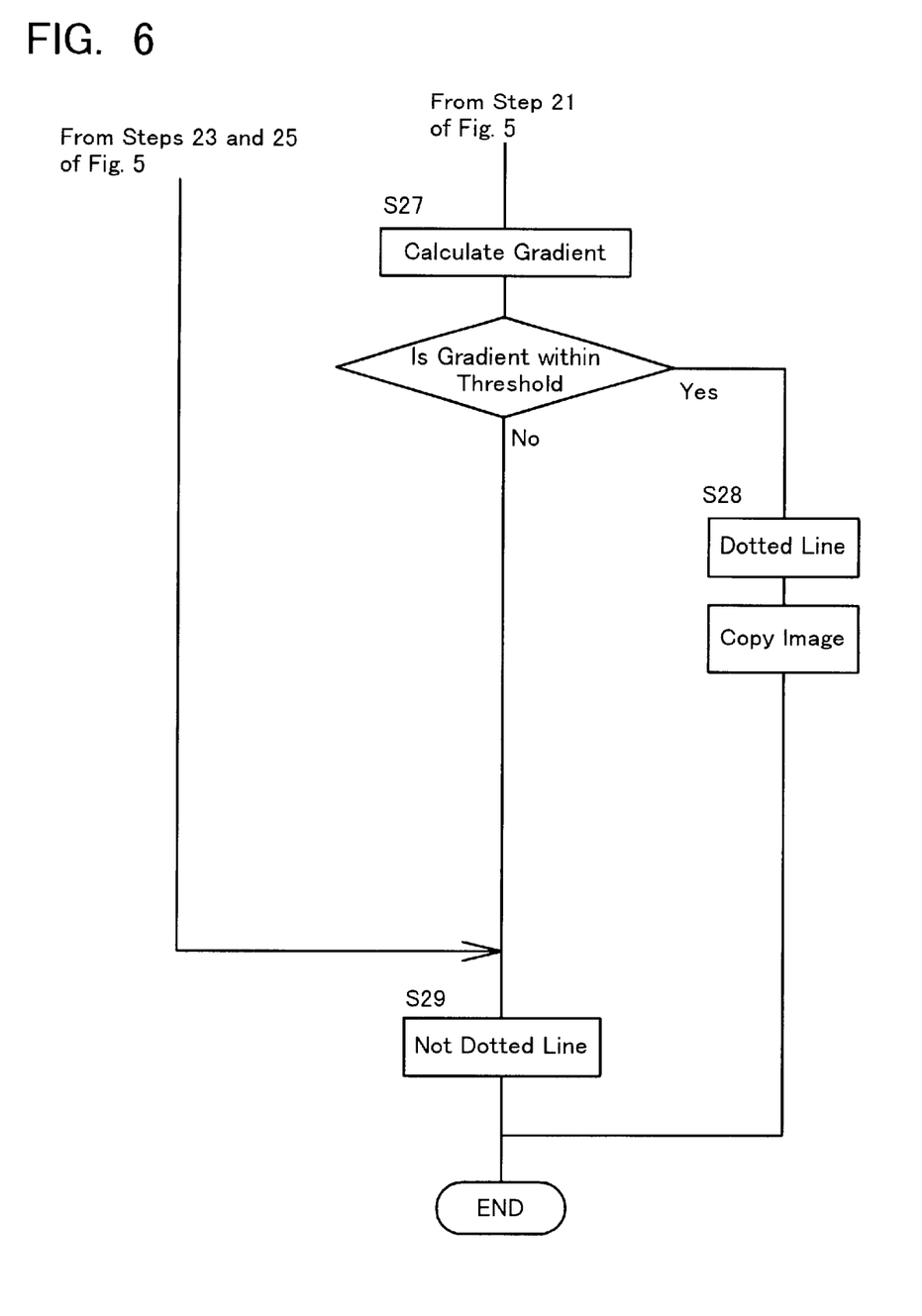
FIG. 6 is a flowchart (part 2) showing the dotted line validity check process in FIG. 1.
Figure 7:
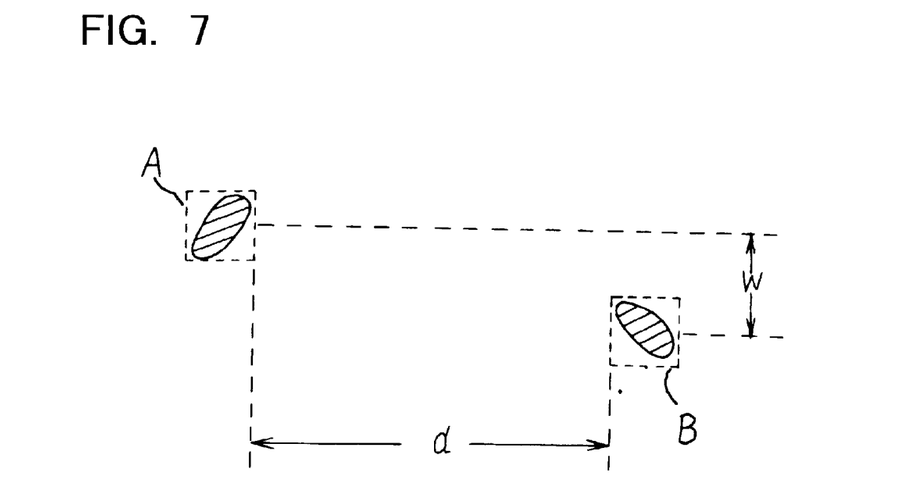
FIG. 7 is an explanatory diagram showing the dotted line extracting process in FIGS. 3 and 4.
Figure 8:
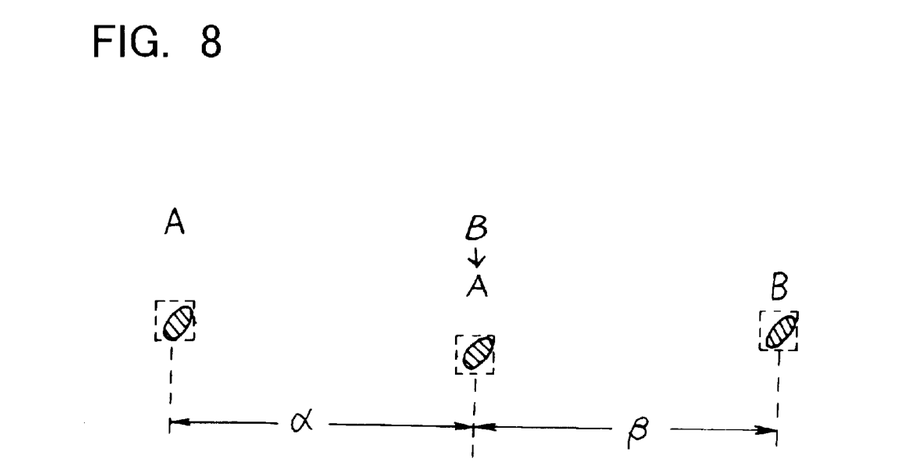
FIG. 8 is an explanatory diagram showing the dotted line validity check process in FIGS. 5 and 6.

FIG. 1 is a block diagram showing one embodiment of the present invention. FIG. 2 is a flowchart showing an isolated point collecting process. FIG. 3 is a flowchart (part 1) showing a dotted line candidate extracting process in FIG. 1. FIG. 4 is a flowchart (part 2) showing the dotted line candidate extracting process in FIG. 1. FIG. 5 is a flowchart (part 1) showing a validity check process of the dotted line in FIG. 1. FIG. 6 is a flowchart (part 2) showing the validity check process of the dotted line in FIG. 1. FIG. 7 is an explanatory diagram showing the dotted line extracting process in FIGS. 3 and 4. FIG. 8 is an explanatory diagram of the dotted line validity check in FIGS. 5 and 6.

As illustrated in FIG. 1, an image scanner 1 reads a document and converts it into binary images. A processor (CPU) 2 extracts dotted lines out of the binary images of the scanner 1. A memory 3 stores necessary items of information for processing by the CPU 2.

The CPU 2 includes an isolated point collecting unit 20 for extracting isolated points from the binary images of the document read by the image scanner 1 and creating isolated point coordinate information, a dotted line candidate extracting unit 21 for determining a dotted line candidate from some conditions such as a spacing between the isolated points on the basis of the isolated point coordinate information and creating isolated point information of the dotted line candidate, and a dotted line validity check unit 22 for checking whether or not the dotted line candidate is valid as a dotted line on the basis of the dotted line candidate information. Note that these units are illustrated by way of blocks of processes executed by the CPU 2.

The memory 3 has an isolated point coordinate storage area 30 for storing the extracted isolated point coordinate information, a dotted line candidate storage are 31 for storing the extracted dotted line candidate information, and a dotted line information storage area 32 for storing the checked dotted line information.

A process of the isolated point collecting unit 20 will be explained referring to FIG. 2.

(S1) The CPU 2 creates a rectangle circumscribing to all the points of the binary image. As shown in FIG. 7, a rectangle circumscribing to a point A is created. The reason why the rectangle circumscribing to the point is created is that a point-to-point spacing etc can be simply judged without depending on a point shape.

(S2) The CPU 2 judges whether or not a size of the rectangle circumscribing to all the points has been checked. Upon finishing checking the size of the rectangle circumscribing to all the points, the processing comes to an end.

(S3) Next, the CPU 2 checks the size of the created rectangle. Sizes of isolated points configuring a dotted line are predetermined. Herein, it is judged whether or not the size of the rectangle falls within a range of sizes of the isolated points which are comparatively small enough to configure the dotted line. If the size of the rectangle does not fall within the range of the sizes of the isolated points, it is judged that those points do not configure the dotted line, and the CPU 2 returns to step S2.

(S4) If the size of the rectangle falls within the range of the sizes of the isolated points, the CPU 2 outputs circumscription information (circumscription coordinates) of those isolated points to a file of the memory 3. The memory 3 stores this item of information in the isolated point coordinate information storage area 30. Then, the CPU 2 goes back to step S2.

The isolated point extracting process described above is executed for all the points of the binary image, thus extracting the isolated points configuring the dotted line.

Next, a process of the dotted line candidate extracting unit 21 will be described with reference to FIGS. 3 and 4.

(S10) The CPU 2 judges whether or not all the isolated points are processed. If all the isolated points are processed even once as an isolated point A or B which will be explained in following steps, the CPU 2 advances to step S18 in FIG. 4.

(S11) The CPU 2 determines an arbitrary isolated point A as a fiducial point on the basis of the rectangle information of the isolated points.

(S12) The CPU 2 judges whether or not all the isolated points are processed. If all the isolated points are processed even once as an isolated point, the CPU 2 returns to step S10.

(S13) The CPU 2 searches for the isolated point B closest to the fiducial point A. That is, the CPU 2 calculates a distance between the fiducial point A and all the isolated points excluding the isolated points which have been processed even once as the isolated point B, and thus seeks out the isolated point B closest to the fiducial point A.

(S14) The CPU 2 compares the distance between the fiducial point A and the isolated point B with a threshold value, and judges whether or not a distance [d] (see FIG. 7) between the fiducial point A and the isolated point B is larger than the threshold value. This threshold value is set to a multiple of integer of an inter-point specified value defined as a condition of the dotted line. Then, if the distance [d] is larger than the threshold value, the CPU 2 returns to step S12. The distance [d] is, as shown in FIG. 7, calculated by calculating a distance between a side edge of the rectangle of the isolated point and a side edge of the rectangle of the isolated point. Therefore, the distance [d] can be easily be calculated from coordinates of the rectangle.

(S15) The CPU 2 calculates a deviation [W] between a central coordinate of the isolated point A and a central coordinate of the isolated point B. Then, the CPU 2 judges whether the deviation [W] is larger than a threshold value or not. If the deviation [W] is larger than the threshold value, the isolated point B does not configure the dotted line, and hence the CPU 2 returns to step S12.

(S16) The CPU 2 calculates a difference between a size of the rectangle of the isolated point A and a size of the rectangle of the isolated point B. Then, the CPU 2 judges whether or not the difference is larger than a threshold value. If the difference is larger than the threshold value, the isolated point B does not configure the dotted line, and therefore the CPU 2 returns to step S12.

(S17) The CPU 2 judges that the isolated points B satisfying these conditions are points configuring the dotted line. Then, the CPU 2 increments the number of points by

[1]. Next, a fiducial point A is replaced with the isolated point B, and the CPU 2 goes back to step S12.

(S18) After all the isolated points are processed, the CPU 2 compares the counted number with a threshold value. This threshold value is a number of points which must be the minimum limit as the condition of the dotted line. If the counted number is not over the threshold value, the CPU 2 judges that the isolated points does not configure the dotted line, and finishes the processing.

(S19) The CPU 2, if the counter number is over the threshold value, judges that is the dotted line. Then, the CPU 2 creates dotted line candidate information. The dotted line candidate information consists of rectangle information of each of the isolated points configuring the dotted line, start- and end-coordinates of the dotted line, and information on a link relationship of each of the isolated points. Then, the processing comes to an end.

Thus, basically a positional relationship between the two adjacent isolated points is judged as a condition of the candidate of the dotted line. Namely, the distance, the deviation quantity and the size difference between the two isolated points are judged as the conditions of the candidate of the dotted line. What has a far distance is not the dotted line. What has a large deviation does not assume the relationship of the dotted line. What has a different size does not bear the relationship of the dotted line. It is desired as the condition of the candidate of the dotted line to judge the distance between the two isolated points as the minimum.

Further, as the candidate of the dotted line, the number of isolated points satisfying the above conditions is judged. If the number of isolated points is small, the dotted line is not established. A considerable number of isolated points are needed for configuring the dotted line.

The isolated points serving as the candidates of the dotted line are thus extracted.

Next, a process of the dotted line validity check unit 22 will be explained referring to FIGS. 5 and 6.

(S20) The CPU 2 fetches the first point A and the second point B from the dotted line candidate information storage area 31. Then, the CPU 2 calculates a distance a between the points A and B. The distance a between the points A and B is, as shown in FIG. 8, a distance between the central coordinate position of the point A and the central coordinate position of the point B. The point-to-point distance can be thereby precisely calculated even in the case of one-dotted line etc. Further, the CPU 2 replaces the point A with the point B.

(S21) The CPU 2 judges whether or not all the points in the dotted line candidate information storage area 31 are processed. If all the points are processed, the CPU 2 proceeds to step S27 in FIG. 6.

(S22) Whereas if all the points are not processed, the CPU 2 seeks out the point B existing a position next to the replaced point A. Then, the CPU 2 calculates a distance β between the point A and B. The distance β between the point A and B is also, as shown in FIG. 8, a distance between the central coordinate position of the point A and the central coordinate position of the point B. Thus, the distance a between the point A and B and the distance β between the replaced points A and B are obtained.

(S23) The CPU 2 calculates a difference between distances α and β. Then, the CPU 2 judges whether or not the difference between the distance α and the distance β is larger than the threshold value. If the difference is larger than the threshold value, the CPU 2 proceeds to step S29.

(S24) The CPU 2 compares the distance a with the distance β, and obtains the larger. The CPU 2 divides the larger distance (α or β) by the smaller distance (β or α), thus obtaining a quotient and a remainder. Then, the CPU 2 judges whether or not this quotient is within a predetermined multiple and whether or not the remainder is within a threshold value.

(S25) when the quotient is not within a predetermined multiple or the remainder is not within the threshold value even if the quotient is within the predetermined multiple, an NG (No Good) number is incremented. Then, the CPU 2 judges whether or not the NG number exceeds a threshold value. If the NG number does not exceed the threshold value, the CPU proceeds to step S26. If the NG number exceeds the threshold value, the CPU proceeds to step S29 in FIG. 6.

(S26) The CPU 2 sets the distance β as the distance α. Then, the CPU 2 replaces the point A with the point B. Then, the CPU 2 returns the step S21.

(S27) The CPU 2 checks a gradient as a condition of the dotted line. The CPU 2 calculates the gradient from coordinates of the first point and of the last point. Then, the CPU 2 judges whether or not this gradient is within a threshold value. When the gradient is not within the threshold value, the CPU 2 proceeds to step S29.

(S28) When the gradient is if within the threshold value, the CPU 2 makes a judgement of its being the dotted line. Then, the CPU 2 makes the dotted line information storage are 32 of the memory 3 stored with the coordinates of the isolated points configuring the dotted line, and the start-and end-coordinates of the dotted line. Further, the CPU 2, for executing an analyzing process afterward, copies an image of the dotted line to the storage area 32. Then, the processing comes to an end.

(S29) When there are not satisfied the condition of the distance in step S23, the condition of the regularity of the distance in step S24 and the condition of the gradient in step S27, the CPU 2 judges that these isolated points doe not configure the dotted line. Then, the processing is finished.

Thus, after extracting the dotted line candidate based on the positional relationship between the two points, the validity of the dotted line is checked in terms of the positional relationship between the points groups as a whole. For checking the validity of the dotted line, the distances between the adjacent points are compared with each other. Then, when the difference between the distances is large, there is made a judgement of not being the dotted line. Further, it is judged whether or not the quotient of the two distances is within the predetermined multiple. When the quotient of the two distances is not within the predetermined multiple, the number not satisfying this relationship is counted and compared with the threshold value. If the number of times not satisfying the relationship is over the threshold value, the judgement is that it is not the dotted line.

Moreover, when satisfying these conditions, the gradient of the dotted line is further checked. With these operations, the validity of the dotted line is checked. It is therefore feasible to extract the dotted line even when some of the isolated points configuring the dotted line are to be lost due to an under-density when in an image reading process, a contact with the character, an intersection with the solid line and an intersection with other dotted lines.

In addition to the embodiment discussed above, the present invention may be modified as follows.

(1) In the embodiment discussed above, the four conditions are judged in order to extract the candidate of the dotted line, and it is desirable that all these conditions be judged. There is not, however, a necessity for judging all these conditions, and some conditions may be omitted as the necessity arises.

(2) For checking the validity of the dotted line, the three conditions are judged, and it is desirable that all these conditions be judged. There is not, however, a necessity for judging all these conditions, and some conditions may be omitted as the case may be.

The present invention has been discussed so far by way of the embodiment but may be modified in many ways within the range of the gist of the present invention, and those modifications are not excluded from the scope of the present invention.

As discussed above, the present invention exhibits the following effects.

(1) Roughly observing the positional relationship between the isolated points, the isolated points configuring the candidate of the dotted line are extracted, and the validity of the dotted line is checked with respect to the extracted dotted line in terms of the regularity of the spacings between the groups of the isolated points. Hence, even when the isolated points are partially lost, the dotted line can be precisely extracted.

(2) Namely, if some of the isolated points essentially configuring the dotted line are lost due to the under-density of the image, the contact with the character, and the intersection with the solid line or the dotted line, the dotted, line can be accurately extracted.

What is claimed is:

1. A method of extracting a dotted line on a document, comprising:
    a first step of extracting isolated points from an image on the document;
    a second step of extracting the isolated points configuring a candidate of the dotted line on the basis of a positional relationship between the two adjacent isolated points; and
    a third step of judging a validity of the candidate of the dotted line from a positional relationship between groups of the extracted isolated points of the candidate of the dotted line,
    wherein said third step includes a step of judging the validity of the candidate of the dotted line by judging the regularity of spacing between the isolated points, and
    wherein said third step further includes a step of judging the validity of the candidate of the dotted line by calculating a gradient of a line segment configured by the group of the isolated points.

2. A method of extracting a dotted line on a document, comprising:
    a first step of extracting isolated points from an image on the document;
    a second step of extracting the isolated points configuring a candidate of the dotted line on the basis of a positional relationship between the two adjacent isolated points; and
    a third step of judging a validity of the candidate of the dotted line from a positional relationship between groups of the extracted isolated points of the candidate of the dotted line,
    wherein said second step includes:
        a step of calculating a distance between the isolated points adjacent to each other;
        a step of comparing the distance with a predetermined threshold value;
        a step of calculating a deviation between the isolated points adjacent to each other; and
        a step of comparing the deviation with a predetermined threshold value.

3. A dotted line extracting apparatus for extracting a dotted line on a document, comprising:
    reading means for reading an image on the document; and
    a processor for extracting isolated points from the image, thereafter extracting the isolated points configuring a candidate for the dotted line on the basis of a positional relationship between the two adjacent points, and then judging a validity of the candidate of the dotted line from a positional relationship between groups of the extracted isolated points of the candidate of the dotted line,
    wherein said processor judges the validity of the candidate of the dotted line by judging a regularity of a spacing between the isolated points, and
    wherein said processor judges the validity of the candidate of the dotted line by calculating a gradient of a line segment configured by the group of the isolated points.

4. A dotted line extracting apparatus for extracting a dotted line on a document, comprising:
    reading means for reading an image on the document; and
    a processor for extracting isolated points from the image, thereafter extracting the isolated points configuring a candidate for the dotted line on the basis of a positional relationship between the two adjacent points, and then judging a validity of the candidate of the dotted line from a positional relationship between groups of the extracted isolated points of the candidate of the dotted line,
    wherein said processor calculates a distance between the isolated points adjacent to each other, and thereafter compares the distance with a predetermined threshold value, and
    wherein said processor calculates a deviation between the isolated points adjacent to each other, and thereafter compares the deviation with a predetermined threshold value.

5. The dotted line extracting apparatus according to claim 4, wherein said processor counts the number of isolated points configuring a candidate of the dotted line, and thereafter compares the number of the isolated points with a predetermined threshold value.

6. A storage medium storing:
    a first information for extracting isolated points from an image on a document;
    a second information for extracting the isolated points configuring a candidate of the dotted line on the basis of a positional relationship between the two adjacent isolated points; and
    a third information for judging a validity of the candidate of the dotted line from a positional relationship between groups of the extracted isolated points of the candidate of the dotted line,
    wherein the third information is also for judging the validity of the candidate of the dotted line by calculating a gradient of a line segment configured by the group of the isolated points.

7. A storage medium storing:
    a first information for extracting isolated points from an image on a document;

a second information for extracting the isolated points configuring a candidate of the dotted line on the basis of a positional relationship between the two adjacent isolated points; and a third information for judging a validity of the candidate of the dotted line from a positional relationship between groups of the extracted isolated points of the candidate of the dotted line, wherein the second information is also for calculating a deviation between the isolated points adjacent to each other, and comparing the deviation with a predetermined threshold value.

* * * * *

UNITED STATES PATENT AND TRADEMARK OFFICE
CERTIFICATE OF CORRECTION

PATENT NO. : 6,556,701 B1  
DATED : April 29, 2003  
INVENTOR(S) : Koichi Chiba et al.

It is certified that error appears in the above-identified patent and that said Letters Patent is hereby corrected as shown below:

Title page,
Item [75], Inventors, please correct the fifth inventor's name from "Maki Tabuki" to -- Maki Yabuki --.

Signed and Sealed this

Twenty-ninth Day of June, 2004

JON W. DUDAS  
*Acting Director of the United States Patent and Trademark Office*